United States Patent

Slator et al.

[15] 3,689,112
[45] Sept. 5, 1972

[54] TUBING CONNECTION HAVING MEANS FOR DISTRIBUTING AXIALLY APPLIED PULLING FORCES

[72] Inventors: Damon T. Slator; Thomas R. Bishop; Archie W. Peil, all of Houston, Tex.

[73] Assignee: Bowen Tools, Inc.,

[22] Filed: Oct. 27, 1970

[21] Appl. No.: 84,439

[52] U.S. Cl. .................. 285/39, 29/237, 29/516, 285/370, 285/382
[51] Int. Cl. ............................................ F16l 13/14
[58] Field of Search......285/382, 382.2, 382.4, 382.5, 285/382.1, 370, 417, 39, 93, 27, 256; 29/516, 517, 523, 23 T

[56] References Cited

UNITED STATES PATENTS

| | | |
|---|---|---|
| 3,017,203 | 1/1962 | Macleod.................285/256 |
| 2,143,279 | 1/1939 | Osborn.................285/382 X |
| 2,574,625 | 11/1951 | Coss.....................285/382 X |
| 2,192,914 | 3/1940 | Ice.....................285/382.2 X |
| 3,326,006 | 6/1967 | Mount...................285/382 X |
| 3,343,252 | 9/1967 | Reesor....................29/516 X |
| 1,578,649 | 3/1926 | Ely...........................29/237 X |
| 3,425,719 | 2/1969 | Burton...................285/382.2 |

FOREIGN PATENTS OR APPLICATIONS

| | | |
|---|---|---|
| 561,128 | 10/1932 | Germany..................285/382 |
| 16,054 | 7/1908 | Great Britain.............285/417 |

*Primary Examiner*—Thomas F. Callaghan
*Attorney*—Pravel, Wilson & Matthews

[57] ABSTRACT

Tubing connection and method of making same, wherein an end of a tube or tubing is joined to a connector by annular crimped portions or indentations at longitudinally spaced areas, forming a beam therebetween, and engaged with the connector for distributing longitudinal pulling forces on the tube to both of the areas of the crimped portions. The ends of two tubes are preferably similarly joined to a common connector.

6 Claims, 2 Drawing Figures

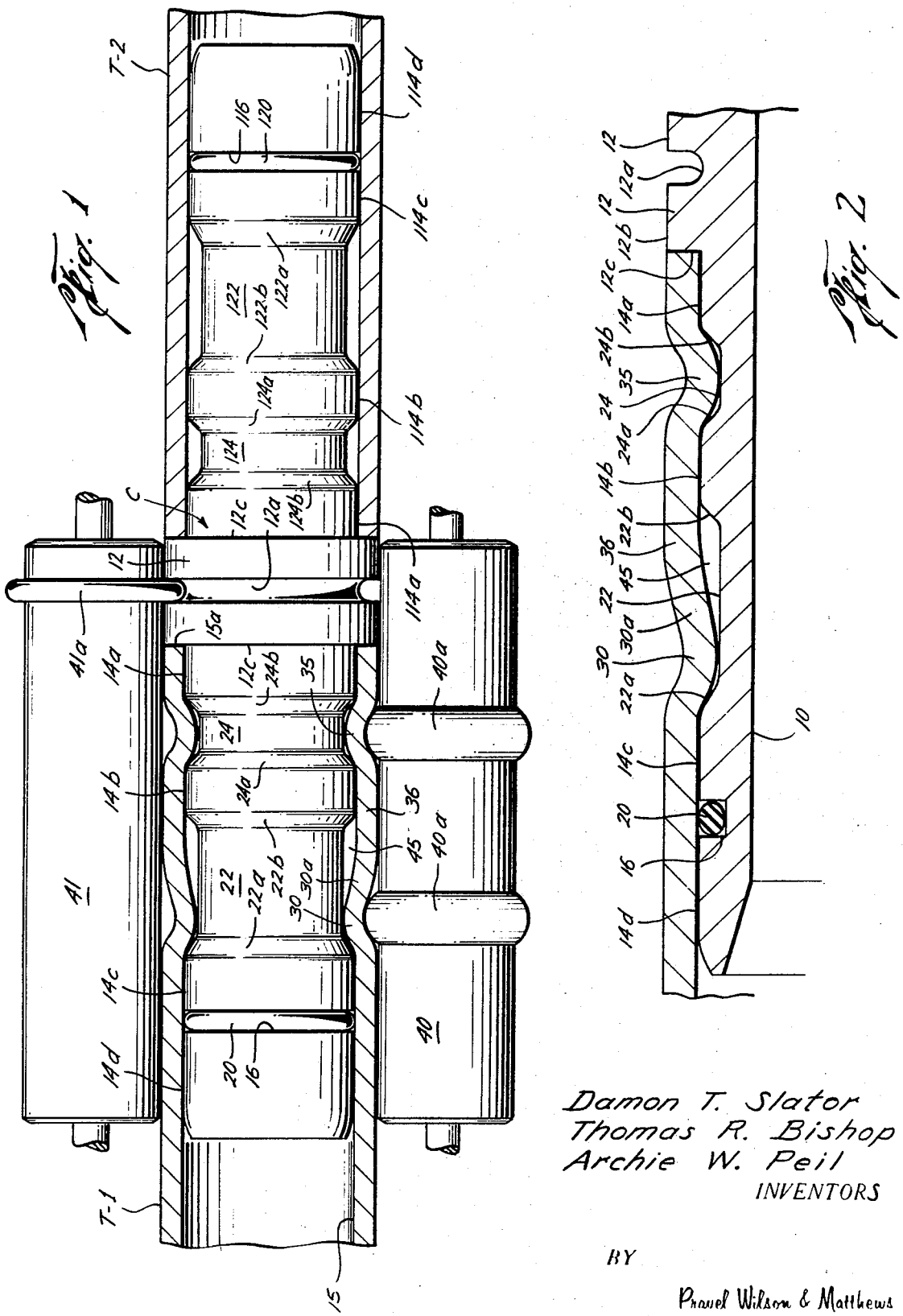

TUBING CONNECTION HAVING MEANS FOR DISTRIBUTING AXIALLY APPLIED PULLING FORCES

BACKGROUND OF THE INVENTION

The field of this invention is tubing connections and methods of making same.

Although crimping a tube onto a connector has been tried in the past for the purpose of mechanically connecting a tube to the connector or to another tube by means of the connector, no such satisfactory mechanical connection has been heretofore devised.

SUMMARY OF THE INVENTION

The present invention relates to a tubing connection and method of making same, wherein one end of at least one tubing section has a connector inserted in its bore, and a mechanical connection is made therebetween by forming a pair of longitudinally spaced indentations or crimps in the tube in a corresponding pair of recesses, with a beam formed therebetween and with the crimps engaging the connector to distribute longitudinal pulling forces acting on the tube to contact areas between both of said indentations and their areas of contact with the connector, whereby a satisfactory mechanical tubing connection is provided.

BRIEF DESCRIPTION OF THE DRAWINGS

FIG. 1 is a sectional view, partly in elevation, illustrating the tubing connection of this invention, with a single connector connecting two sections of tubing, and with the left-hand section of tubing shown in the process of being connected to the connector and with the right-hand section of tubing merely positioned on the connector prior to crimping; and FIG. 2 is an enlarged sectional view of a fragmentary portion of the tubing connection of this invention, illustrating in detail specific features thereof.

DESCRIPTION OF THE PREFERRED EMBODIMENT

In the drawings, the letter C designates generally a connector which is adapted to have tubing section T-1 and T-2 connected thereto in accordance with the method of this invention. Each section of tubing T-1 or T-2, when connected to the connector C constitutes the tubing connection of this invention, although the tubing connection may include, and normally does include, both tubing sections T-1 and T-2 on a single connector C. Thus, although the connector C is primarily used for splicing or connecting together two section of tubing T-1 and T-2, the connector C may be utilized for connecting to only one of such tubing sections so that other functions of the connector are possible.

The connector C is preferably formed of metal such as steel, aluminum or an alloy, and it has a central passage or bore 10 therethrough in the preferred form of the invention. A central guide groove section 12 is formed on the external surface of the connector C with a central guide groove 12a formed therein. The external diameter 12b of the section 12 is preferably of substantially the same size as the external diameter of the major portion of each of the tubing sections T-1 and T-2 when in the final connected positions. Also, each of the radially extending sides 12c of the section 12 provides a shoulder for the abutment of the end of each of the tubing sections T-1 and T-2. The portion of the connector C to the left of the intermediate or central section 12 as viewed in FIGS. 1 and 2 is referred to throughout this specification as the left-hand portion of the connector C, whereas the portion to the right of the intermediate section 12 is referred to as the right-hand connector portion.

To facilitate the description of the tubing connection of this invention, the left hand portion of the connector C with the section of tubing T-1 thereon is first hereinafter described. Thus, the left-hand connector portion has external surfaces 14a, 14b, 14c and 14d which all have substantially the same diameter, which diameter is of a size to fit into the bore 15 of the tubing section T-1 prior to any substantial alteration in the size thereof. In most instances, it is desirable to flare or enlarge the internal diameter of the bore 15 prior to inserting the connector C therein so as to prevent damage to an O-ring 20 formed of rubber or other similar sealing material and which is positioned in a groove or recess 16 in the connector C. However, as will be more evident hereinafter, any such flaring or enlargement is rolled back or otherwise reduced to the normal internal diameter of the bore 15 during the connection of the section of tubing T-1 to the connector C.

The left-hand portion of the connector C has a first annular recess 22 and a second annular recess 24, both of which a preferably of the same external diameter and which are longitudinally spaced apart with respect to each other. The width of the recess 22 is greater than the width of the recess 24, considering the width of the recess 22 to be the distance from an annular shoulder 22a to an annular shoulder 22b, and the width of the recess 24 to be the distance from an annular shoulder 24a to an annular shoulder 24b.

The section of tubing T-1 is formed with two longitudinally spaced crimps or crimped portions 30 and 35, which are preferably rolled into the metal by any suitable apparatus, part of which is schematically illustrated in FIG. 1 and which includes a crimping roller 40 having crimping ridges 40a thereon. Such apparatus also preferably includes a guide roller or rollers such as 41 having a guide ridge 41a which is adapted to fit within the guide groove 12a to maintain the crimping roller 40 in the proper position when rotating same around the external surface of the section of tubing T-1. The preferred form of the apparatus used for such crimping operation is illustrated in our co-pending U. S. application Ser. No. 84,397.

It is to be noted that the crimp 35 is formed so as to fit closely within the connector recess 24, whereas the crimp 30 is smaller than the width of the crimping recess 22. By reason of the crimp 30 being of a shorter width than the crimping recess 22, any thickening of the metal of the tubing T-1 during the rolling of the crimps 30 and 35 may occur in the area of the crimping recess 22 so that the area designated generally as 30a may be thicker than the rest of the tubing section T-1. Also, an annular space 45 is left between the crimping recess 22 and the internal surface of the tube T-1 over the recess 22 which provides for an annular resilient beam 36 which extends between the crimps 30 and 35.

Such beam and its resiliency contributes to the distribution of pulling forces on the tube section T-1, as will be more evident hereinafter.

It should be noted that the crimp 30 contacts the area of the curved or sloping annular shoulder 22a, and the crimp 35 contacts the curved or sloping surface of the annular shoulder 24a. The slope or angle of the annular surface 22a relative to the longitudinal axis of the connector C is less than the angle of the slope or surface of the shoulder 24a, with the result that when a longitudinal force is applied to the tubing section T-1, there is an initial tendency of the metal of the tube T to move longitudinally at the crimp 30 relative to the shoulder 22a. In other words, there is a tendency of the inclined surface of the crimp 30 to slide or ride upwardly on the sloping surface 22a to a greater extent than the crimp 35 tends to ride upwardly on the sloping or inclined surface 24a. Therefore, instead of placing all of the pulling force at the point or area of contact between the crimp 30 and the surface 22a, the force is applied at that area, but the contact area between the crimp 35 and the shoulder 24a also takes part of the load. This increases the effective holding action between the tube section T-1 and the connector C.

The parts of the connector C in the right-hand portion which correspond with those in the left-hand portion have the same numerals and letters, but preceded by the prefix "1". A crimping roller 40 is utilized for crimping the tubing section T-2 from its original shape illustrated in FIG. 1 to substantially the same shape as illustrated in FIG. 1 with respect to the tubing section T-1.

In carrying out the method of this invention, the tubing section T-1 is positioned on the connector C, preferably in a slightly flared condition so that the internal diameter of the bore 15 does not damage the O-ring 20 when the connector C is inserted into the bore 15.

With the end 15a of the tubing section T-1 in contact with the laterally or radially extending shoulder 12c, suitable means are utilized for forming the crimped portions or crimps 30 and 35 so as to produce the product heretofore described which has the load distribution to both of the shoulders 22a and 24a when a longitudinal pull is applied to the tubing T-1 in a left-hand direction as viewed in FIG. 1. The three rollers 40 and 41 also serve to roll the tube back down to its original diameter at the connector surfaces 14a, 14b and 14c.

The tubing section T-2 is connected in the same manner as the tubing section T-1 and when so connected the load is distributed to the crimps which correspond to the crimps 30 and 35 (not shown for the tubing section T-2) at the areas of contact with the annular shoulders 122a and 124a. The O-rings 20 and 120 provide a fluid-tight seal between the connector C and the tubing section T-1 and T-2 respectively.

The foregoing disclosure and description of the invention are illustrative and explanatory thereof, and various changes in the size, shape, and materials as well as in the details of the illustrated construction may be made without departing from the spirit of the invention.

We claim:

1. A tubing connection between an end of a tubing section and a connector, comprising:
   a connector having an inner end and an outer end and a first annular recess and a second annular recess disposed between said ends and formed in its external surface in longitudinally spaced relationship to each other;
   a length of metallic tubing having a bore in which said inner end of said connector and said recesses thereon are positioned;
   a pair of longitudinally spaced permanently deformed annular crimps in said tubing aligned with and extending into said recesses; and
   said first recess being disposed nearer the inner end of said connector than said second recess and each of said recesses having an inner shoulder, with the inner shoulder on said first recess being formed with a slope which is at a smaller angle to the axis of the connector than the inner shoulder in said second recess, said crimps engaging said shoulders whereby longitudinal pulling on said tubing relative to said connector results in the pulling forces being substantially uniformly distributed to the areas of contact between both of said crimps and said connector.

2. The structure set forth in claim 1, wherein:
said first recess has a greater longitudinal width than the width of the crimp extending therein to form a resilient beam between the crimps to facilitate the distribution of the pulling load to the areas of contact between both of said crimps and the connector.

3. The structure set forth in claim 2, wherein:
the wall of the tubing is thicker at the crimp extending into said first recess than elsewhere.

4. The structure set forth in claim 1, including:
said connector having an annular seal ring groove; and
a resilient seal ring disposed in said groove and forming a fluid-tight seal between said connector and said tubing.

5. The structure set forth in claim 1, wherein:
said connector has substantial duplicates of said first and second recesses over which the end of a second tubing section is disposed; and
a pair of longitudinally spaced annular crimps in said second tubing aligned with and extending into said substantial duplicates of said first and second recesses, with the shoulders thereof also being constructed in the same manner to distribute pulling forces on said second tubing to the areas of contact between said crimps in said second tubing and said connector.

6. The structure set forth in claim 5, wherein:
said connector has an intermediate guide groove section having an external diameter which is approximately the same as the external diameter of said tubing, and which has an annular guide groove formed therein.

* * * * *